Figure 1:
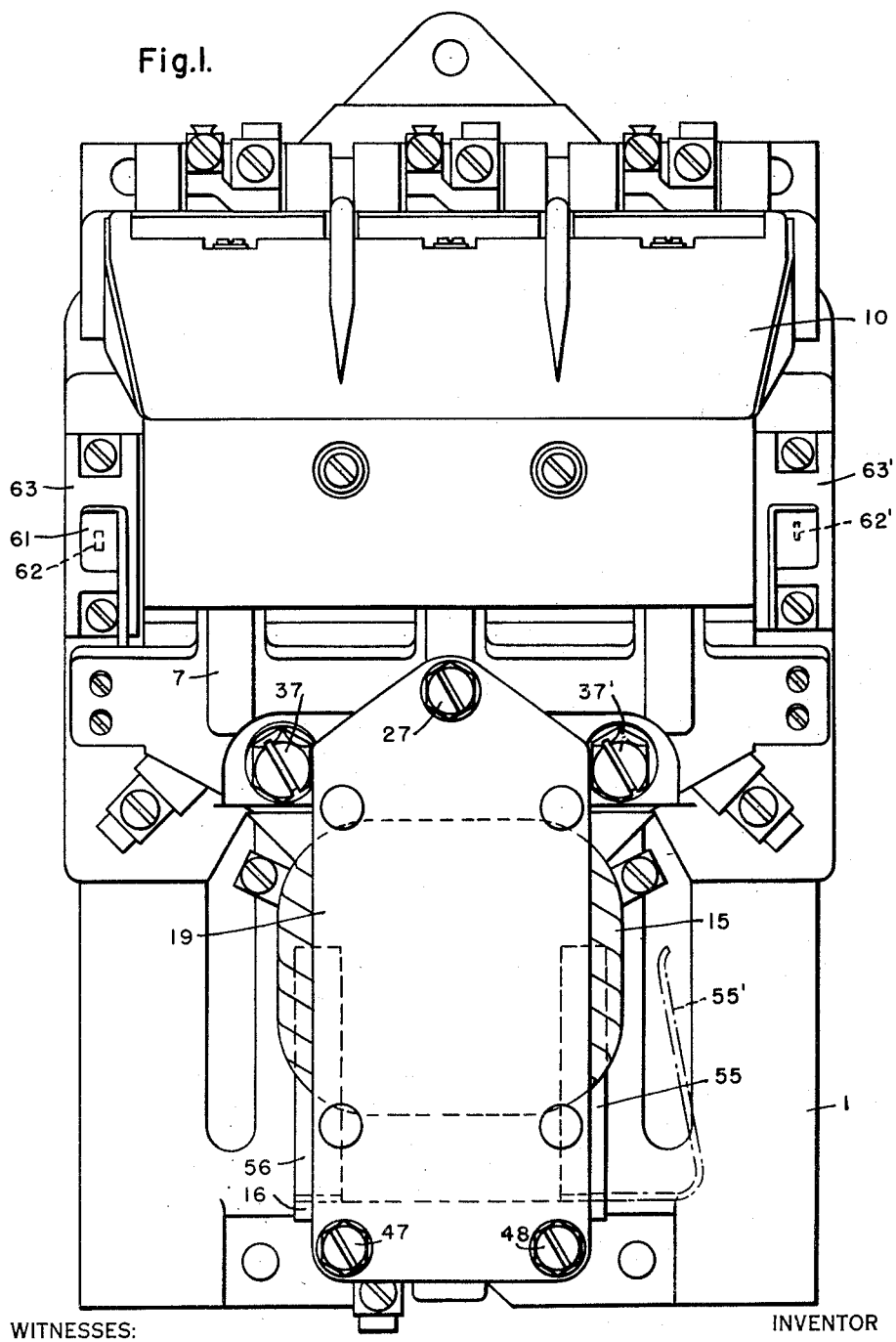

April 24, 1951  D. ELLIS  2,550,110

MAGNET ASSEMBLY FOR CONTACTORS

Filed Nov. 1, 1949  4 Sheets-Sheet 1

INVENTOR
Delbert Ellis.
BY
ATTORNEY

April 24, 1951 D. ELLIS 2,550,110
MAGNET ASSEMBLY FOR CONTACTORS
Filed Nov. 1, 1949 4 Sheets-Sheet 2

WITNESSES:
E. A. McCloskey.
Wm. L. Groome

INVENTOR
Delbert Ellis.
BY C. M. Avery
ATTORNEY

April 24, 1951 D. ELLIS 2,550,110
MAGNET ASSEMBLY FOR CONTACTORS
Filed Nov. 1, 1949 4 Sheets-Sheet 3
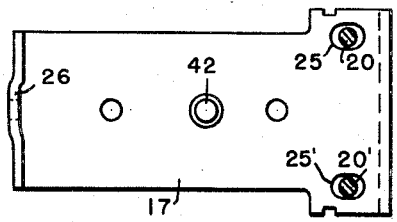
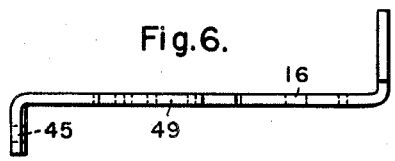
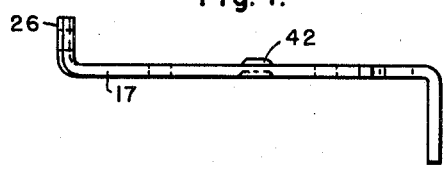
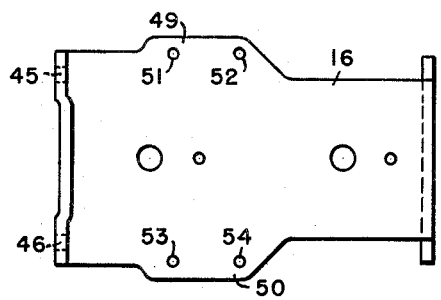
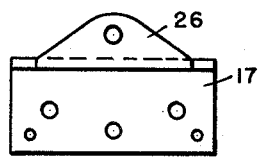
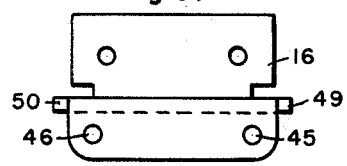
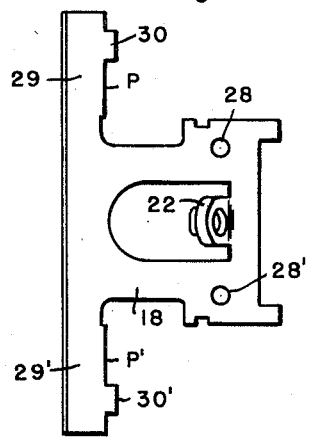
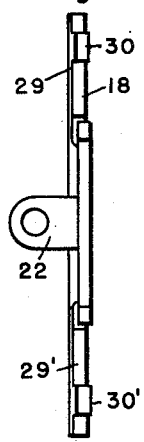
WITNESSES:
E. A. M'Closkey
Nw. C. Groome
INVENTOR
Delbert Ellis.
BY
C. M. Arey
ATTORNEY April 24, 1951 D. ELLIS 2,550,110
MAGNET ASSEMBLY FOR CONTACTORS
Filed Nov. 1, 1949 4 Sheets-Sheet 4
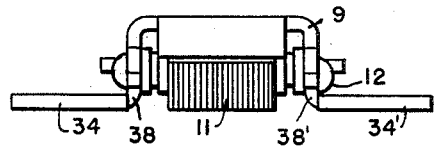
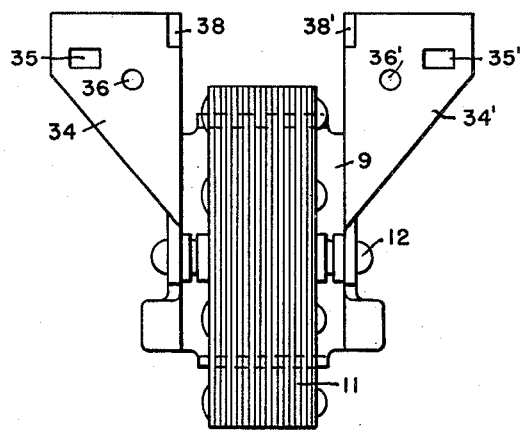
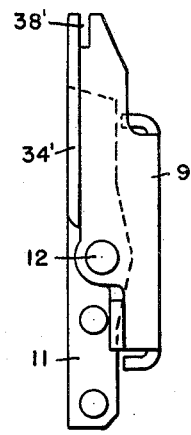
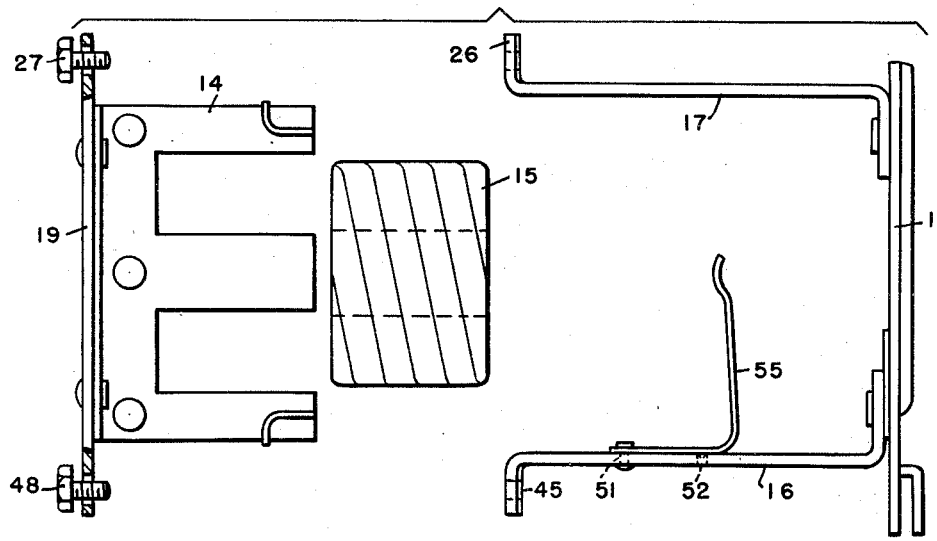
WITNESSES:
E. A. McCloskey
Nw. C. Groome
INVENTOR
Delbert Ellis.
BY
C. M. Avery
ATTORNEY Patented Apr. 24, 1951

2,550,110

UNITED STATES PATENT OFFICE 2,550,110

MAGNET ASSEMBLY FOR CONTACTORS

Delbert Ellis, Beaver, Pa., assignor to Westinghouse Electric Corporation, East Pittsburgh, Pa., a corporation of Pennsylvania Application November 1, 1949, Serial No. 124,922

6 Claims. (Cl. 175—336)

My invention relates to electromagnetic switches, relays and other contractors and, more particularly, to the magnet assemblies of such contactors.

It is an object of my invention to devise a contactor magnet assembly which, in comparison with the known contactors, makes the contactor magnet more easily attachable to the other parts of the contactor and more readily permits removing the magnet therefrom even after the contactor is mounted in a housing and accessible only from the front. It is also an object of the invention to make the core and coil of the contactor removable from each other and to permit fastening these parts together in their correct positions merely by mounting the magnet on the contactor structure.

Still another object of the invention is to make the armature assembly of the contactor accessible, removable or adjustable as regards its amount of overtravel or bearing alignment without requiring a removal of an installed contactor from its housing or support and without requiring the disconnection of the contactor terminals.

In order to achieve these objects, and in accordance with a feature of my invention, I provide the contactor base with two brackets and attach to these brackets a removable front plate which covers the magnet core and magnet coil. According to a more specific feature, these two brackets form a three-point support for the plate, and the fastening means for securing the plate to the brackets are all serviceable from the front side of the plate.

According to another feature of my invention, the coil of the magnet is loosely seated on the magnet core and is held in position by an elastic abutment or spring means which bear against the coil when the above-mentioned front plate is attached to the brackets.

The just-mentioned spring means, according to a further feature of my invention, are pivotally mounted on one of the brackets so that they can be swung away from the bracket to make the underlying armature or other contactor parts easily accessible when the front plate with the magnet parts is removed.

According to another feature of the invention, I secure the pivot bearing for the armature assembly of the contactor to one of the above-mentioned brackets by screws or the like fastening means that permit adjusting and aligning the pivot axis and are all accessible from between the two brackets regardless of whether the magnet and armature assembly are assembled with or removed from the brackets.

Figure 2:
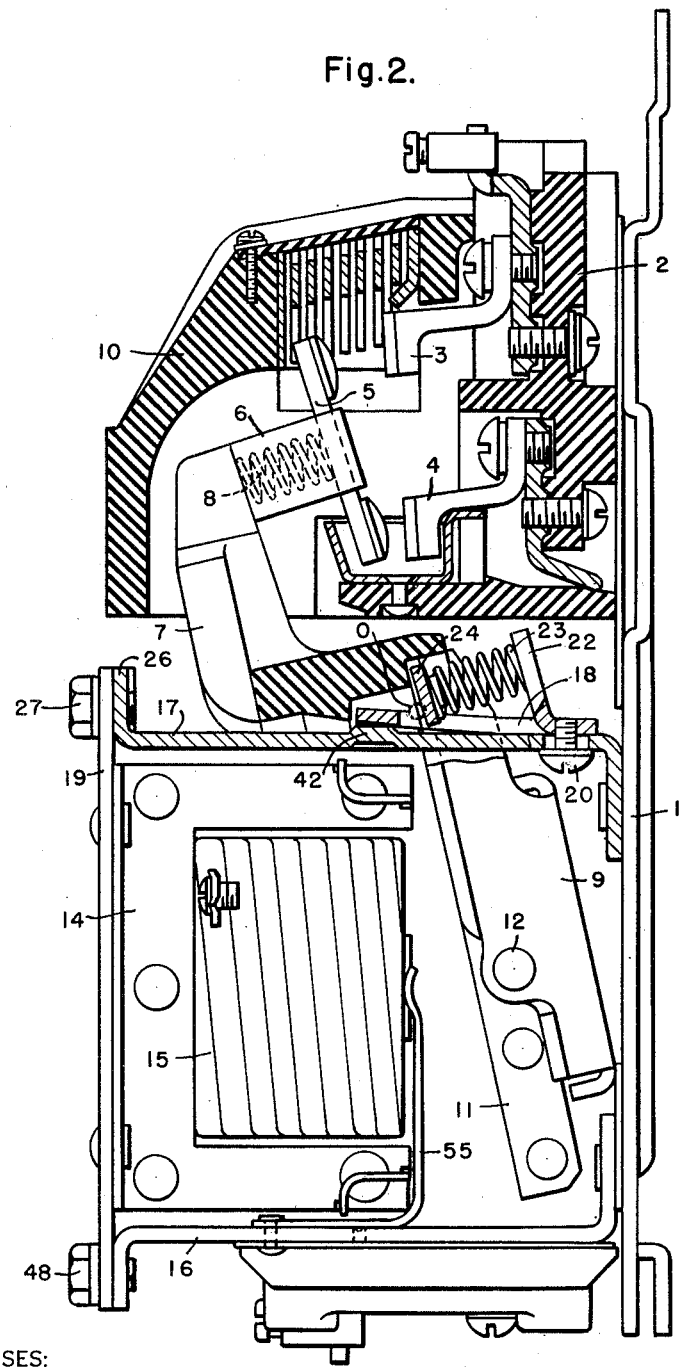

These and other objects and features will be apparent from the following description of the embodiment exemplified by the drawings, in which:

Figure 1 is a front view of a contactor equipped with a magnet assembly according to the invention, Fig. 2 is a part-sectional side view of the same contactor, Figs. 3 to 5 show different views of one of the two supporting brackets for holding the magnet assembly, Figs. 6 to 8 show different views of the other bracket, Figs. 9 to 11 show different views of a bearing and spring-supporting member for the magnet armature, Figs. 12 and 13 show two views of a spring abutment member, Figs. 14 to 16 show different views of the armature assembly of the contactor, and Fig. 17 is an exploded view of the magnet assembly.

The illustrated contactor has a base plate 1 (Figs. 1, 2, 17) to be mounted on a panel or other support. An insulator 2 (Fig. 2) is firmly secured to the base 1 and carries stationary contacts 3 and 4. A movable contact member 5 bridges the stationary contacts 3 and 4 when in closed position. The contact member 5 is mounted in a saddle 6 which is attached to the insulating body 7 of an armature assembly. A coiled contact spring 8, disposed in the saddle 6, biases the movable contact member 5 away from the insulating body 7. The body 7 is firmly secured to a cradle structure 9 (Figs. 2, 14 to 16) of sheet metal which is pivoted for angular motion about a stationary pivot extending perpendicularly to the plane of illustration of Fig. 2 at the point surrounded in Fig. 2 by a broken circle marked O. The contacts are enclosed by an arc box structure 10 which is fastened to the insulating base 2. A magnet armature 11 is pivoted to the cradle structure 9 by a pin 12 for limited angular motion relative to the structure 9. The electromagnet of the contactor has a laminated E-shaped core structure 14 fastened to a front plate 19 (Figs. 1, 2, 17). Plate 19 is attached to brackets 16 and 17 mounted on the base 1. A bearing member 18 (Figs. 2, 9 to 11) is located adjacent the bracket 17 and is attached to the bracket 17 by fastening screws 20 and 20' (Figs. 2, 3). A lug portion 22 of member 18 forms an abutment for an armature kick-out spring 23 whose other end engages an abutment member 24 associated with the cradle structure 9 of the armature assembly (Figs. 2, 11 to 13).

The bracket 17 has two elongated openings 25 and 25' for the free passage of the respective fastening screws 20 and 20' (Fig. 3). A single lug 26 at the front end of bracket 17 (Figs. 2 to 5) has a threaded bore for receiving a screw 27 for fastening the front plate 19. The front end of bracket 16 has two threaded bores 45, 46

(Figs. 6 to 8) to receive two additional screws 47, 48 (Figs. 1, 2) for fastening the plate 19 to the bracket. The ends of the two brackets form a three-point support for the plate so that a correct positioning of the plate is always secured.

The bearing member 18 has two threaded bores 28, 28' (Fig. 9) for receiving the fastening screws 20 and 20'. Due to the elongated shape of openings 25 and 25' in bracket 17, the bearing member 18 can be displaced to a limited extent in the horizontal direction relative to Fig. 2. The bearing member 18 has two lateral arms 29 and 29' (Figs. 9, 10) so as to have the general shape of the letter T. The arm 29 of the T-shaped bracket portion is provided with a pivot edge P which is interrupted by a lug 30 (Fig. 3). The arm 29' has a corresponding pivot edge P' and a lug 30'. The two edges P and P' are in alignment with each other at the location marked by the circle O in Fig. 2. The bracket 17 has a projection 42 (Figs. 2, 3, 4) which serves as a spacing element and abuts against the bearing member 18. Member 18 has an angle bend so as to provide a slight clearance below the bearing axis $\theta$ to provide a frictionless knife edge bearing.

The cradle structure 9 appertaining to the movable armature assembly has two flanges 34 and 34' (Figs. 14 to 16). Flange 34 has an opening 35 engageable by the lug 30 of the bearing member 18 (Figs. 9, 10). Flange 34' has a corresponding opening 35' engageable by lug 30'. The flanges 34 and 34' are further provided with a threaded opening at 36 or 36' (Fig. 15) for receiving respective fastening screws 37, 37' (Fig. 1) that secure the insulating body 7 to the cradle structure 9 of the armature assembly. The flanges 34 and 34' have respective cutout notches at 38 and 38' (Figs. 15, 16). These two notches receive the ends of the separate abutment member 24 (Figs. 2, 12, 13) for the kickout spring 23. Spring 23 holds the abutment member 24 in engagement with the cradle structure 9. It also biases the cradle structure into proper engagement with the pivot edges P and P' and, of course, biases the armature assembly toward the contact opening position. The armature assembly is limited to angular movement between two positions about the pivot edges P, P'. When the magnet coil 15 is deenergized, the armature assembly, under the biasing force of spring 23, assumes the illustrated position in which the movable contact member 5 is separated from the stationary contacts 3 and 4 and is forced against the bottom of the contact guide 6 by the contact spring 8. When the magnet coil 15 is energized, the armature 11 is attracted by the magnet and moves the assembly into contact-closing position. Near the end of that movement, the contact member 5 engages the stationary contacts and is arrested while the rest of the armature assembly is permitted to perform an additional movement (overtravel). The proper amount of overtravel and a proper alignment of the movable contacts in multipole contactors is obtained by adjusting the bearing member 18 relative to the bracket 17 before fastening the member 18 in the correct position by means of the screws 20 and 20'.

An energizing coil 15 of the magnet assembly is removably seated on the center leg of the laminated core 14 (Fig. 17) but, when the magnet assembly is attached to the brackets, is held in the proper position by resilient means to be described presently.

The bracket 16 (Figs. 6 to 8) has lateral projections 49, 50. Each projection has two holes 51, 52 or 53, 54. An angular leaf spring 55 is pivoted about a rivet which traverses the hole 51 (Fig. 17), and a similar leaf spring 56 (Fig. 1) is movably attached to the bracket 16 by a rivet that traverses the hole. When the leaf springs are in the normal position shown in Figs. 1, 2 and 17, a dowel projection of the leaf spring engages the hole 52 or 54 and thus arrests the leaf spring in that position. The end of each leaf spring is then located underneath the coil 15 so that when the plate 19 with the magnet core and coil is placed on the brackets and fastened thereto, the two leaf springs bear against the coil 15 and hold it securely in the proper position. When the plate 19 with the attached parts is removed from the brackets as shown in Fig. 17, the free ends of the leaf springs can be bent away from the base 1 so that the dowel moves out of the hole 52 or 54. Then the leaf springs can be swung outwardly to the position indicated in Fig. 1 for leaf spring 55 by the broken-line at 55'. The leaf springs are thus removed from the space between the brackets 16 and 17. Consequently, after removal of the plate 19 the armature assembly is readily accessible for inspection, repair or replacement. When then the fastening screws 37 and 37' (Fig. 1) are removed, the member 24 can be separated from the armature structure 9 and both parts can then be removed from the brackets. Since the fastening and adjusting screws 20 and 20' for the bearing member 18 are accessible from between the brackets, it is also possible to change the adjustment of the pivot bearing if necessary. All this can be done while the contactor is installed in a housing or on a panel without requiring removal of the contactor or disconnection of the power leads. All the above-mentioned operations can be performed from the front side of the contactor, and it will be noted that in the illustrated design all terminal screws are also accessible from the front.

Attached to the insulating body of the armature assembly are two arms 61 of which only one is shown in Fig. 1. These arms serve to operate the movable contact member 62 or 62' of an auxiliary or interlock contact 63 or 63'. For instance, of a design as described in my copending application, Serial No. 124,921.

It will be apparent to those skilled in the art that contactors according to the invention can be modified as to the design, shape, interconnection and number of individual parts without departing from the objects and essence of the invention and within the scope of its features as set forth in the claims annexed hereto.

I claim as my invention.

1. A magnet assembly for contactors, comprising a base, two rigid brackets firmly mounted on said base and extending rectangularly thereto in spaced relation to each other, an armature structure pivotally mounted at one of said brackets for movement toward and away from said base, a front plate bridging the ends of said respective brackets remote from said base and being firmly attachable to said ends, a magnet core structure firmly secured to said plate at the plate side directed toward said base, a coil loosely seated on said core structure, and resilient supporting means abutting against said coil to hold it toward said plate when said plate is attached to said brackets.

2. A magnet assembly for contactors, comprising a base, two rigid brackets mounted on said base and extending reactangularly thereto in spaced relation to each other, an armature structure pivotally mounted at one of said brackets for movement toward and away from said base, a front plate bridging the ends of said respective brackets remote from said base and being firmly attachable to said ends, a magnet core structure firmly secured to said plate, a coil loosely seated on said core structure, and spring means attached to said other bracket and bearing against said coil when said plate is attached to said ends.

3. A magnet assembly for contactors, comprising a base, two rigid brackets mounted on said base and extending rectangularly thereto in spaced relation to each other, an armature structure pivotally mounted at one of said brackets for movement toward and away from said base, a front plate extending across said brackets remote from said base and being firmly attachable to said brackets, a magnet core firmly secured to said plate and having a center leg extending toward said base, a magnet coil removably seated on said center leg, and spring means mounted on said other bracket and bearing against said coil to hold it toward said plate when said plate is attached to said brackets, said spring means being movable relative to said other bracket in a direction away from said armature structure when said plate with said core and coil are removed from said brackets to then make said armature structure accessible between said brackets.

4. A magnet assembly for contactors, comprising a base, two rigid brackets mounted on said base and extending rectangularly thereto in spaced relation to each other, an armature structure pivotally mounted at one of said brackets for movement toward and away from said base, a front plate extending across said brackets remote from said base and being firmly attachable to said brackets, a magnet core firmly secured to said plate and having a center leg extending toward said base, a magnet coil loosely seated on said leg, two angular leaf springs, each having one arm pivotally mounted on either side of said other bracket to permit moving the other arm from a first position underneath said coil to a second position laterally of said coil, said one arm of each spring being engageable with said coil to hold it toward said plate when said spring is in said first position and said plate is attached to said brackets.

5. In a magnet assembly according to claim 4, said other bracket and said one arm of each of said leaf springs having respective dowel and bore means mutually engageable when said spring is in said first position so as to releasably arrest said spring in said first position.

6. A magnet assembly for contactors, comprising a base, two rigid brackets mounted on said base and extending rectangularly thereto in spaced relation to each other, an armature structure pivotally mounted at one of said brackets for movement toward and away from said base, a front plate mountable on the ends of said brackets remote from said base, an electromagnet firmly attached to said plate and located between said brackets when said plate is mounted on said bracket ends, one of said brackets having two points of support and said other bracket having a single point of support for said plate at said respective ends, and three fastening screws serviceable from the side of said plate away from said base, said screws traversing said plate and being engageable with said bracket ends at said three points.

DELBERT ELLIS.

REFERENCES CITED

The following references are of record in the file of this patent:

UNITED STATES PATENTS

| Number | Name | Date |
|---|---|---|
| 2,094,199 | Werner | Sept. 28, 1937 |
| 2,303,066 | Ray | Nov. 24, 1942 |
| 2,424,308 | Ellis | July 22, 1947 |

FOREIGN PATENTS

| Number | Country | Date |
|---|---|---|
| 234,452 | Great Britain | Aug. 6, 1925 |
| 437,955 | Great Britain | Nov. 5, 1935 |